UNITED STATES PATENT OFFICE.

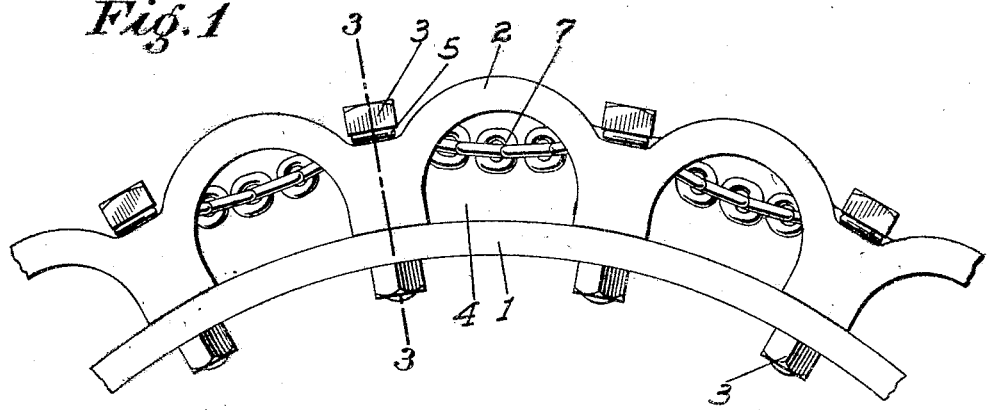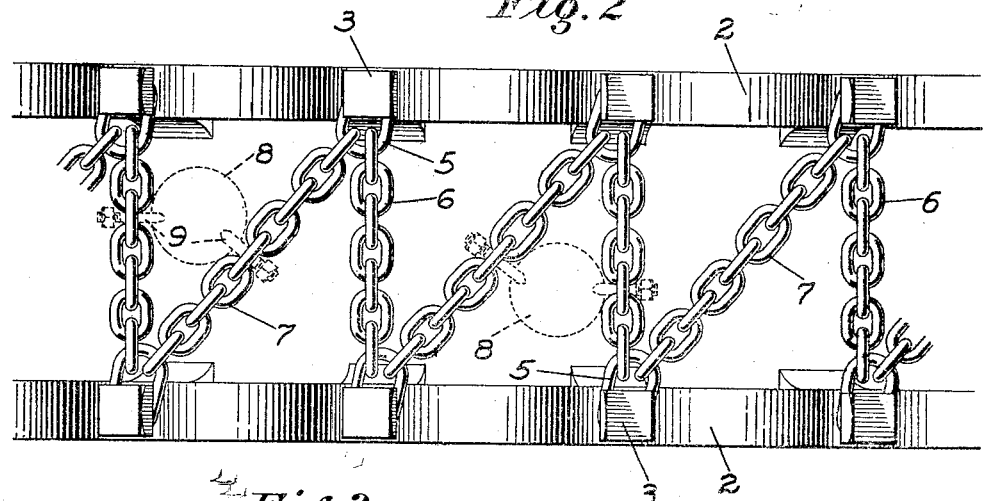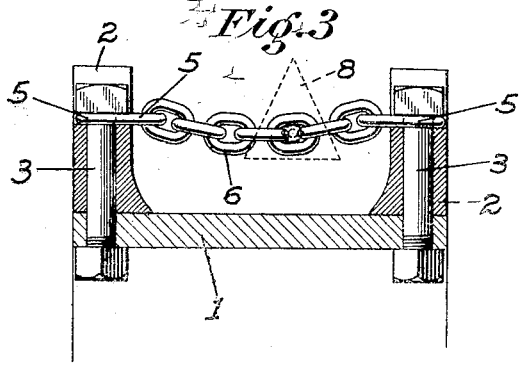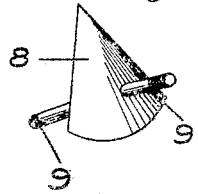

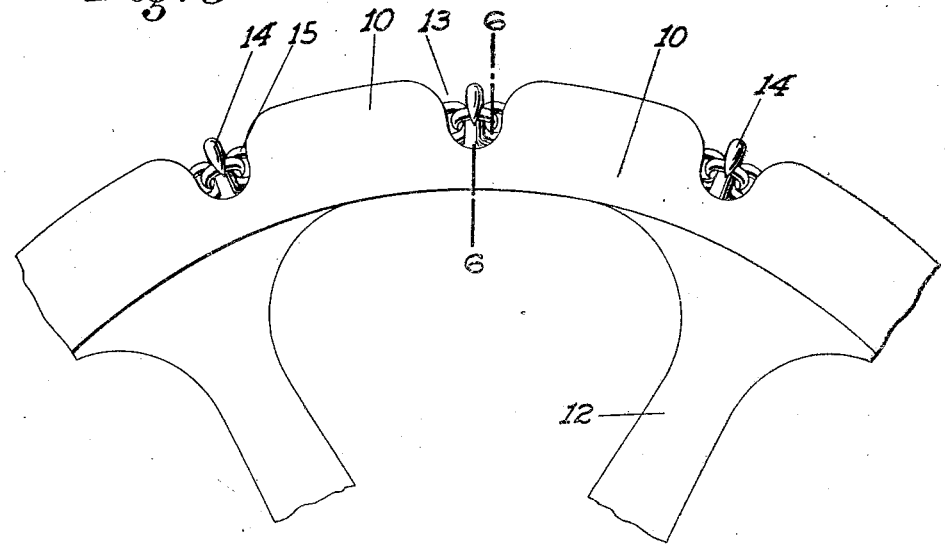
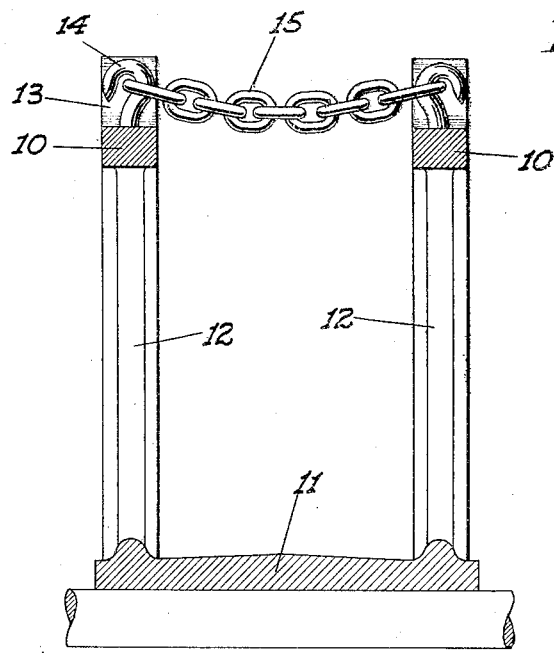

JOSEPH C. F. DICK, OF STOCKTON, CALIFORNIA.

TREAD ATTACHMENT FOR TRACTOR-WHEELS.

1,347,018.   Specification of Letters Patent.   Patented July 20, 1920.

Application filed August 28, 1919. Serial No. 320,327.

*To all whom it may concern:*

Be it known that I, JOSEPH C. F. DICK, a citizen of the United States, residing at Stockton, in the county of San Joaquin, State of California, have invented certain new and useful Improvements in Tread Attachments for Tractor-Wheels; and I do declare the following to be a full, clear, and exact description of the same, reference being had to the accompanying drawings, and to the characters of reference marked thereon, which form a part of this application.

This invention relates to improvements in tread attachments for tractor wheels, the principal object of the invention being to provide a tread attachment adapted to be permanently or temporarily attached to a plain tractor wheel rim, to give additional tractive power to the machine when running in soft ground, and which at the same time will provide enough smooth surface to take the weight of the tractor on hard roads and enable it to be operated thereon without the danger of cutting into or otherwise marring the surface of the road.

Another object is to provide a tread attachment for the purpose which will give a continuous bearing or tractive surface for the wheels when the same are in soft or plowed ground and which will not bank the dirt when the tractor is making a turn, nor dig out and lift the dirt and carry it around with the wheel as is so common an occurrence when ordinary grousers are used.

A third object is to provide a traction increasing surface which will never under any conditions bear against or rest on the actual rim of the wheel itself, thereby insuring greater wear of both the wheel and the tread attachment, and add to the comfort of the operator of the vehicle.

Still another object is to make such traction increasing members flexible, so that with every revolution of the wheel, any dirt which may have lodged between the same and the tread members will be shaken free, and will drop off the wheel instead of packing thereon, thus providing a self-cleaning device.

In the foregoing citation of objects my invention is presumed to be an entirely demountable device, apart from the wheel itself.

The principle of the invention and therefore the objects as stated may also be carried out with the use of a wheel especially constructed and adapted for the purpose of carrying my flexible tread or grouser members and in which the ordinary tread surface of the wheel may be omitted as superfluous.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

On the drawings similar characters of reference indicate corresponding parts in the several views.

Figure 1 is a fragmentary side elevation of a tractor wheel rim showing my improved tread attachment mounted thereon.

Fig. 2 is a top plan view of the same.

Fig. 3 is a cross section taken on a line 3—3 of Fig. 1.

Fig. 4 is a perspective view of a form of auxiliary grouser adapted to be secured to the chains of my tread attachment.

Fig. 5 is a fragmentary side elevation of a wheel having a flexible tread or grouser suspending means formed integral therewith.

Fig. 6 is a cross section of the same, taken on a line 6—6 of Fig. 5.

Referring now more particularly to the characters of reference on Figs. 1 to 4 of the drawings, numeral 1 denotes the plain rim of a tractor wheel preferably of the widefaced type, as is customary in tractor construction.

My improved tread attachment consists essentially of a pair of continuous flange members 2 of suitable width and height adapted to be placed around the rim, one on each edge thereof. These flanges are secured to the rim by radially positioned bolts 3, suitably spaced apart, the flanges between the bolts being cut away to form arch-shaped spaces as at 4. The outer edges of the flanges are also arch-shaped between the bolts, and extend above the heads of the bolts 3, so that the latter will never be worn or pounded out of shape by coming in contact with the hard surface of a road on which the flanges are adapted to rest.

On the bolts 3, between the heads of the same and the flanges 2, are large links 5, to each of which pair of opposite and corresponding links are connected transverse chains 6, so that chain bridges or grousers extend across the space between the flanges at spaced intervals all around the wheel.

A diagonal chain 7 extends from each link 5 on one side to the adjacent link on the other side, thereby forming a zig-zag pattern so that the chain bearing surface is continuous all around the wheel.

I have described the chain grousers as being arranged in this particular manner as I believe such an arrangement will give ample traction under all conditions. If desired, however, such arrangement may be altered at will, and the chain criss-crossed, etc.

These chains are to be stretched fairly taut, so that they will never sag enough to touch the rim 1, thereby preventing undue wear of both rim and chains.

The flexible property of chains, which is never entirely lost even when tightly stretched, I rely on to make my tread attachment self cleaning, as the give and take of the chains as they enter and leave the ground will effectually prevent any dirt from packing or clinging thereto. This self-cleaning feature is further aided by the arched construction of the rim flanges, in that any dirt collecting between the chains and the rim will be forced out through the openings therein.

If desired to get additional traction over that had with the chains, I provide cone shaped members 8, adapted to be hung between the chains 6 and 7 in staggered order, with the points of such members projecting outwardly, as indicated in Fig. 3.

These members are held in position by means of bolts or pins 9 formed integral with, or driven into them, and adapted to project through radial links in the chains 6 and 7, as shown in Fig. 2.

These members also, when so secured, while having a positive hold in the ground, will have a certain amount of flexibility, so that any dirt tending to pack thereabout when they leave the ground will be worked loose.

In Figs. 5 and 6, I show a form of wheel adapted to be cast in one unit, and comprising a pair of horizontally spaced and equal sized rings 10, connected to a common hub 11 by means of spokes 12.

The rings form the tread surface of the wheel on hard roads, and are provided with alined and spaced interstices 13 in which are positioned radial hooks 14, whose upper edges are below the outer periphery of the rings.

Flexible chains 15 are secured to these hooks, which point outwardly, in the same manner as the chain 6—7 previously described, the rings 10 taking the place of the removable flanges 2.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A flexible tread attachment for tractor wheels comprising in combination with vertical flanges on the outer periphery and edges of the wheel a plurality of flexible members between such flanges and secured thereto.

2. A flexible tread attachment for tractor wheels comprising in combination with vertical flanges on the outer periphery and edges of the wheel, the flanges being provided with spaced interstices, suspending members in such interstices, and chains connected to such suspending members and extending between the flanges.

3. A flexible tread attachment for tractor wheels comprising in combination with vertical flanges on the outer periphery and edges of the wheel, the flanges being provided with spaced interstices, suspending members in such interstices, and chains between the flanges in transverse and diagonal arrangement around the periphery of the wheel and secured to the suspending members.

4. A flexible tread attachment for tractor wheels comprising in combination with vertical flanges on the outer periphery and edges of the wheel, the flanges being provided with spaced interstices, suspending members in such interstices, chains between the flanges and arranged in transverse and diagonal order around the periphery of the wheel, and cone shaped members having their points projecting outwardly positioned between adjacent diagonal and transverse chains and adapted to be secured thereto.

In testimony whereof I affix my signature.

JOSEPH C. F. DICK.